(12) United States Patent
Elwart

(10) Patent No.: US 10,788,139 B2
(45) Date of Patent: Sep. 29, 2020

(54) EARTHQUAKE WATER SHUTOFF VALVE

(71) Applicant: John Ernest Elwart, Playa Del Rey, CA (US)

(72) Inventor: John Ernest Elwart, Playa Del Rey, CA (US)

( * ) Notice: Subject to any disclaimer, the term of this patent is extended or adjusted under 35 U.S.C. 154(b) by 372 days.

(21) Appl. No.: 15/998,042

(22) Filed: Jun. 15, 2018

(65) Prior Publication Data

US 2019/0383410 A1    Dec. 19, 2019

(51) Int. Cl.
*F16K 17/36* (2006.01)

(52) U.S. Cl.
CPC ............ *F16K 17/36* (2013.01); *F16K 17/363* (2013.01)

(58) Field of Classification Search
CPC ............................... F16K 17/36; F16K 17/363
See application file for complete search history.

(56) References Cited

U.S. PATENT DOCUMENTS

| | | | | |
|---|---|---|---|---|
| 3,791,396 A * | 2/1974 | Nelson | .................... | F16K 17/36 137/38 |
| 3,878,858 A * | 4/1975 | Yamada | .................. | F16K 17/36 137/38 |
| 4,103,697 A * | 8/1978 | Kiesow | ................... | F16K 17/36 137/45 |
| 4,513,763 A * | 4/1985 | Ware | ....................... | F16K 17/36 137/38 |
| 6,206,337 B1 * | 3/2001 | Veillet, Jr. | ............... | F16K 31/06 137/78.1 |
| 6,705,340 B1 * | 3/2004 | McGill | .................... | F16K 17/36 137/15.03 |
| 7,814,924 B2 * | 10/2010 | McGill | .................... | F16K 17/36 137/39 |

* cited by examiner

*Primary Examiner* — Ryan A Reis

(57) ABSTRACT

This disclosure is directed to a traditional gate valve whereby the parts are retrofitted to enable the gate valve to stop the flow of water in an earthquake. This device utilizes a weight and springs to trigger a response which closes the gate valve.

2 Claims, 2 Drawing Sheets

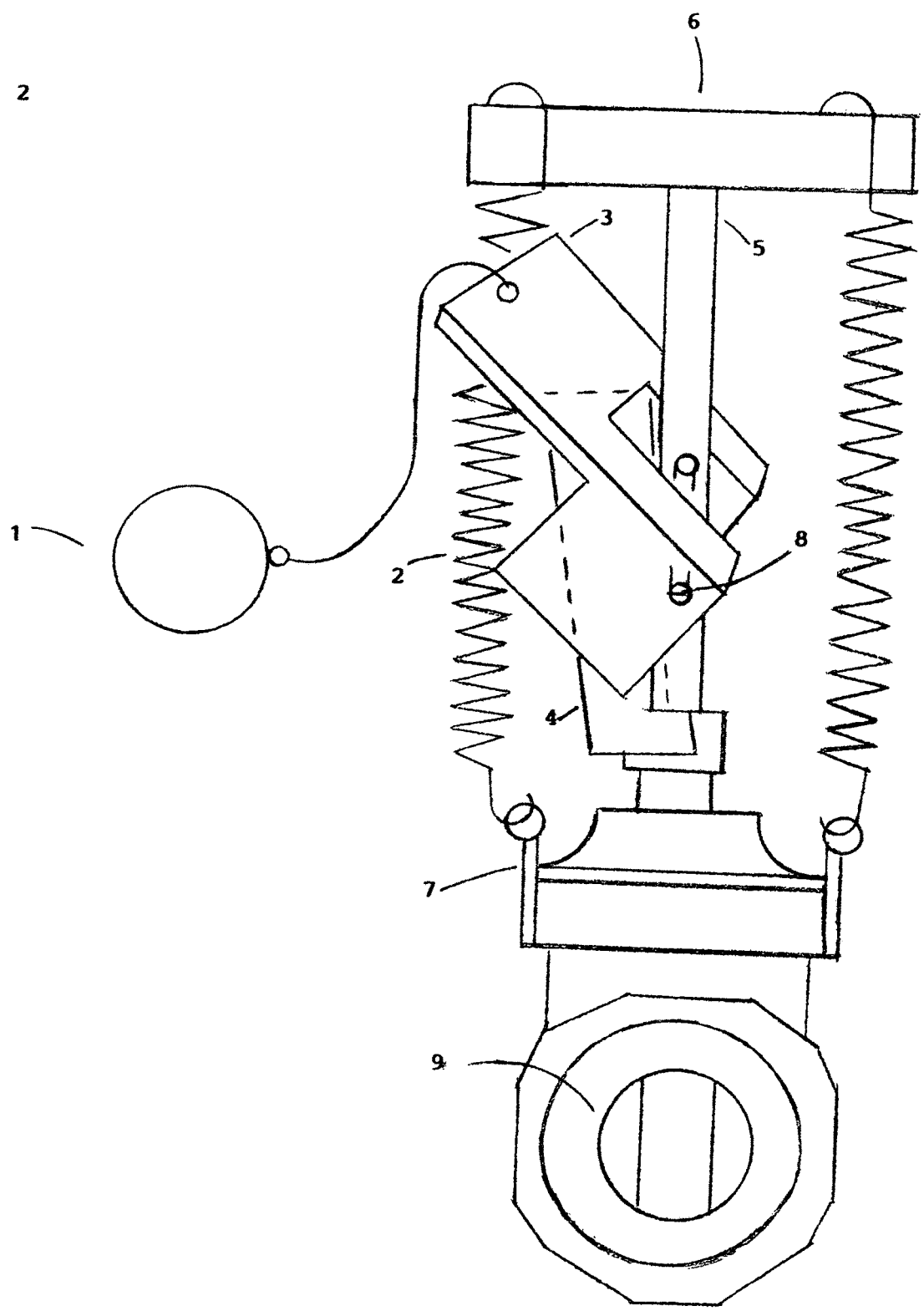

EARTHQUAKE WATER SHUTOFF VALVE

FIELD OF THE INVENTION

While there are products that shut off the flow of gas in an earthquake, the most difficult effort is to shut off the flow of water in an earthquake. Since the water pressure in a pipe is between 60 and 120 pounds, the resistance factor is about 100 times as strong as the minimal pressure in a residential gas line, which is ½ pound per square inch. Ball valves that shut off water in an earthquake have been invented but most are not reliable and too large for use in a residential environment. If not, they would be sold in large amounts in hardware stores.

The present invention relates to a common gate valve whereby parts are either modified or eliminated to enable the modified gate valve to shut off the flow of water in an earthquake.

SUMMARY OF THE INVENTION

The earthquake water shutoff valve of the present invention provides the function of stopping the flow of water in the occurrence of an earthquake, thereby stopping floods from broken water pipes and possible electrical shock should water from a broken pipe get into contact with electricity.

BRIEF DESCRIPTION OF THE DRAWINGS

FIG. 2 shows the device in tripped position with the trigger mechanism at about 120 degrees elevated.

DETAILED DESCRIPTION OF THE INVENTION

Figure 1:
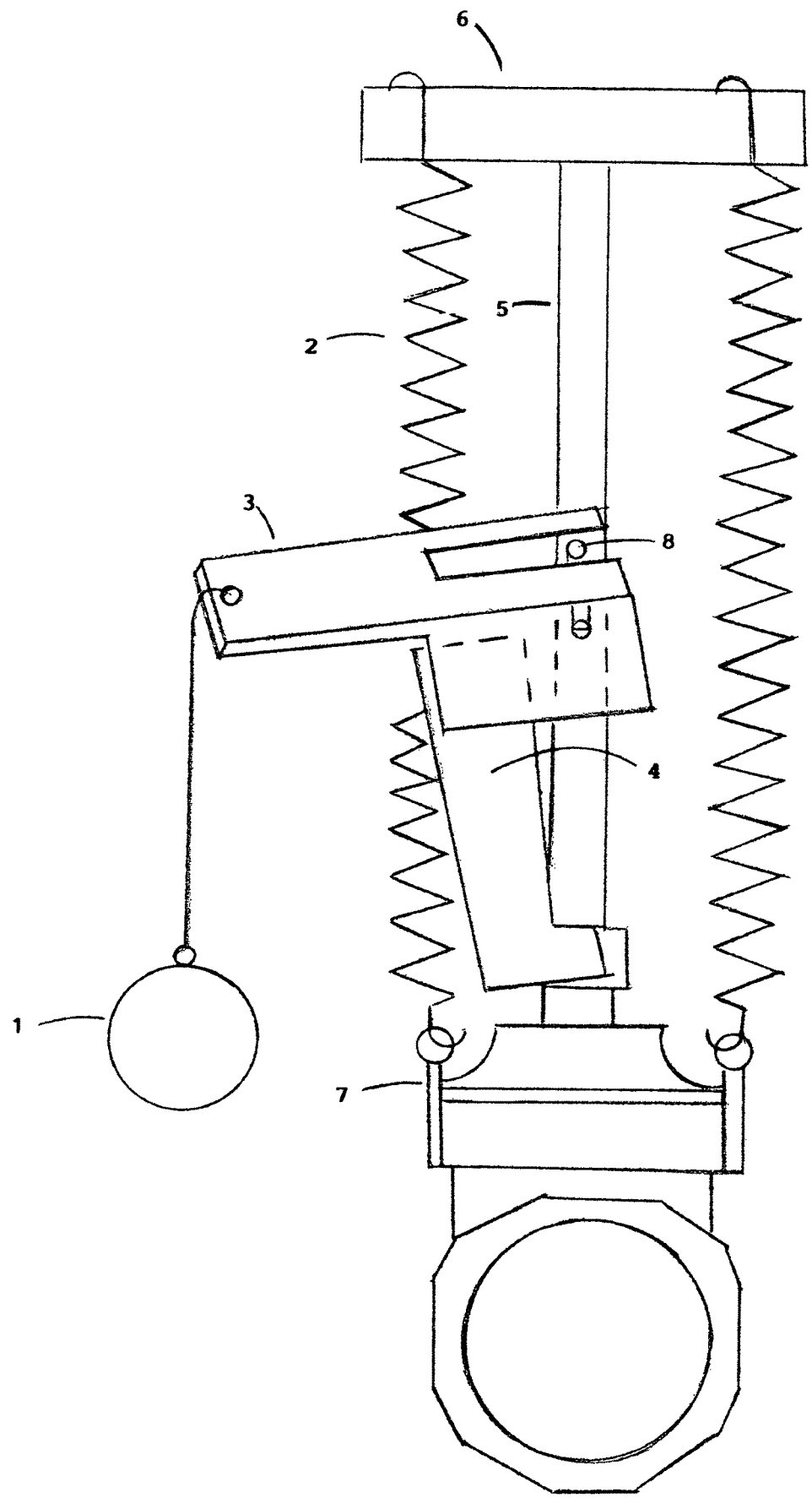
FIG. 1 shows the gate valve handle in fully up, armed position. The trigger mechanism is in horizontal position and the weight of the lead sinker resists the tension of the springs connectively fastened from the handle to the valve body.

The objects and advantages of the present invention are provided by its ability to shut off water in an earthquake. The invention utilizes a common gate valve retrofitted with additional parts to transform it into a responsive mechanism in the occurrence of an earthquake. Further advantages of the present invention are the prevention of floods and possible electrical shock should a flood occur and water becomes in contact with electricity.

The present invention is a modified gate valve whereby the original screw threaded shaft connectably to the gate has been replaced with a non threaded rod. The screw threads in the original gate have been drilled out and the non threaded rod is soldered to the gate drilled out recess. Two springs are connected to the handle, one on the left and one on the right side of the handle and the bottom of the springs are connected to the left and right side of the valve body by a piece of brass soldered to the valve body on both sides with a hole drilled in each piece of brass to enable the springs to be connected to the holes. A trigger mechanism is fastened connectively by a screw and nut to the non threaded rod by drilling a hole in the rod. The trigger has a notch cut out in it slightly larger than the diameter of the rod to enable it to move downward along the rod when the device trips in an earthquake. A two pound lead sinker is connected to the trigger by a string and the weight of the sinker will hold the trigger in horizontal position by resisting the tension of the springs. In the occurrence of an earthquake, the sinker will jump and the spring tension will overpower the weight of the sinker and close the gate of the valve.

To support the trigger mechanism, a piece of brass is soldered to the rod nut which is originally used as a seal with an o ring to prevent leakage. The support piece holds the trigger in horizontal position by the sinker and the brass piece of metal soldered to the nut. Therefore together with the sinker which resists the tension of the springs, the trigger rests on the support. The present invention is a counterbalance between a weight and two springs.

Referring to FIG. 1, of the present invention, 1 is the two pound lead sinker which is connected by a string to 3, the trigger mechanism. 3 is held in horizontal position by the sinker and also by 4, the trigger support. The springs are connected to top of handle 6, and also connected to the valve body by spring support 7. The trigger is connected to rod 5 by screw and nut 8, and the sinker resists the tension of springs 2. In actual use the trigger where the string hole is located will rise about 160 degrees in the occurrence of an earthquake and the trigger portion connected to rod 5 will descend approximately 2 inches, thus closing gate 9.

Referring to FIG. 2, of the present invention, the illustration shows the device in tripped mode whereby gate 9 is now closed and blocking the flow of water. For illustration purposes it shows the trigger 3 to be elevated approximately 120 degrees.

I claim:

1. An earthquake water shutoff comprising:
a retrofitted gate valve whereby the original threaded gate and connecting rod of the gate valve have been modified and replaced with a non-threaded gate and connecting rod;
the gate valve further comprising:
means to move the gate and connecting rod upward and downward in a vertical manner;
a trigger mechanism connected to the connecting rod;
a weight connected to the trigger mechanism;
means to hold the gate in an open position;
springs connected to a handle on the connecting rod and connected to a spring support on a valve body of the gate valve;
means to close the gate; and
means to support the trigger mechanism in a horizontal position.

2. The earthquake water shutoff of claim 1, further comprising means to both resist the spring tension and enable the spring to close the gate.

* * * * *